Jan. 24, 1956

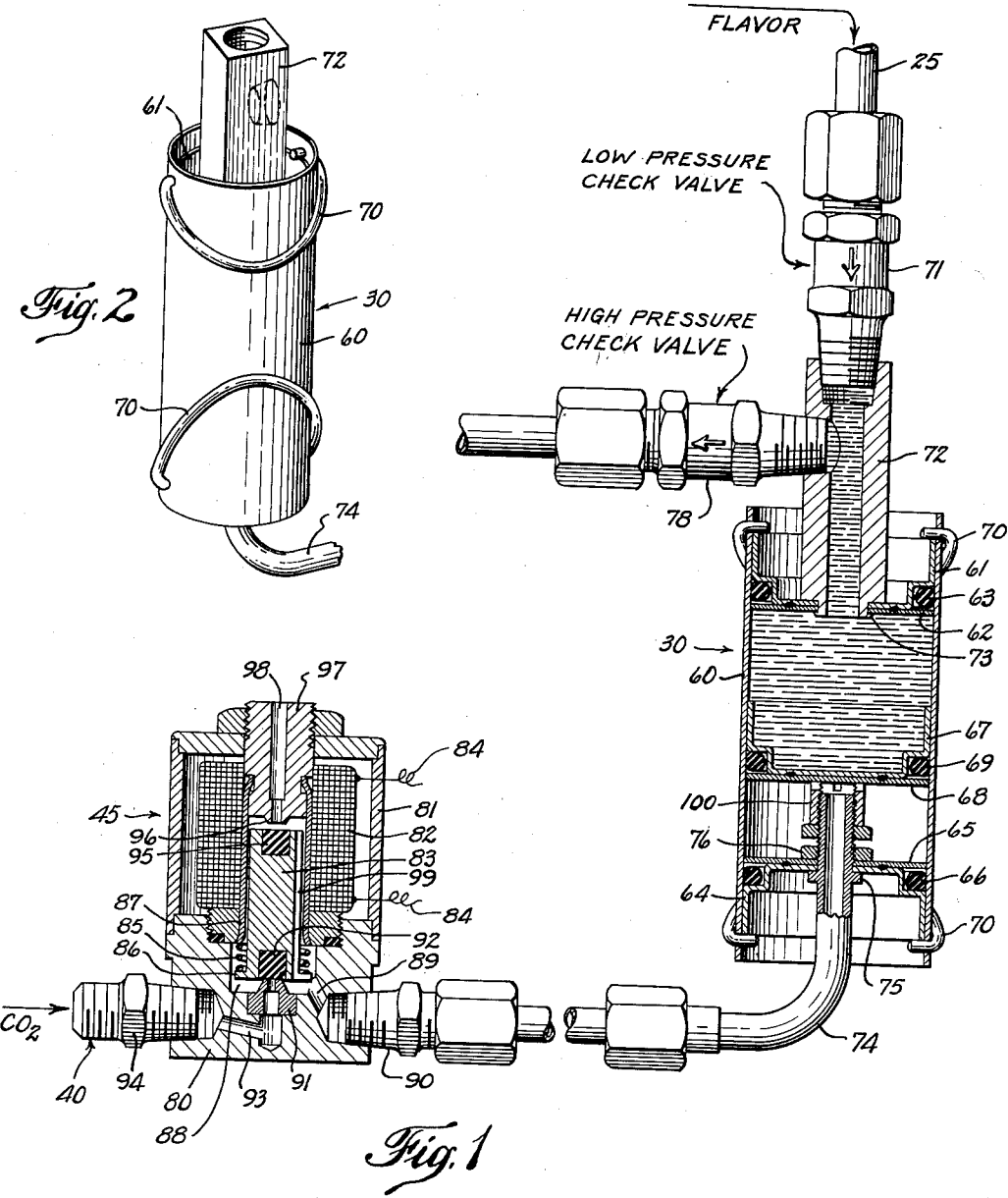

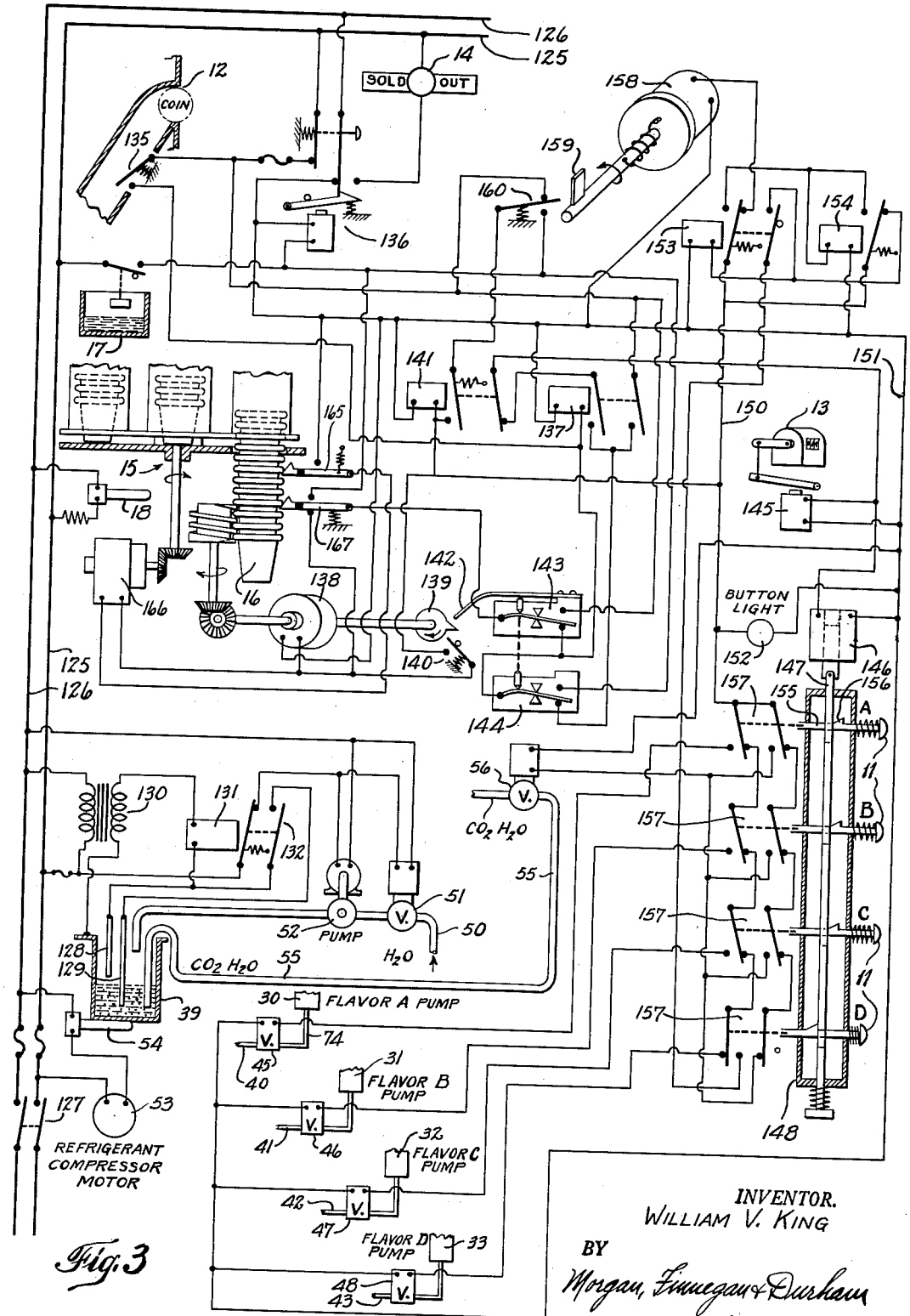

W. V. KING 2,731,906

AUTOMATIC BEVERAGE VENDING MACHINES

Filed Oct. 17, 1951

INVENTOR.
WILLIAM V. KING
BY
Morgan, Finnegan + Durham
ATTORNEYS.

Jan. 24, 1956  W. V. KING  2,731,906
AUTOMATIC BEVERAGE VENDING MACHINES
Filed Oct. 17, 1951  4 Sheets-Sheet 4
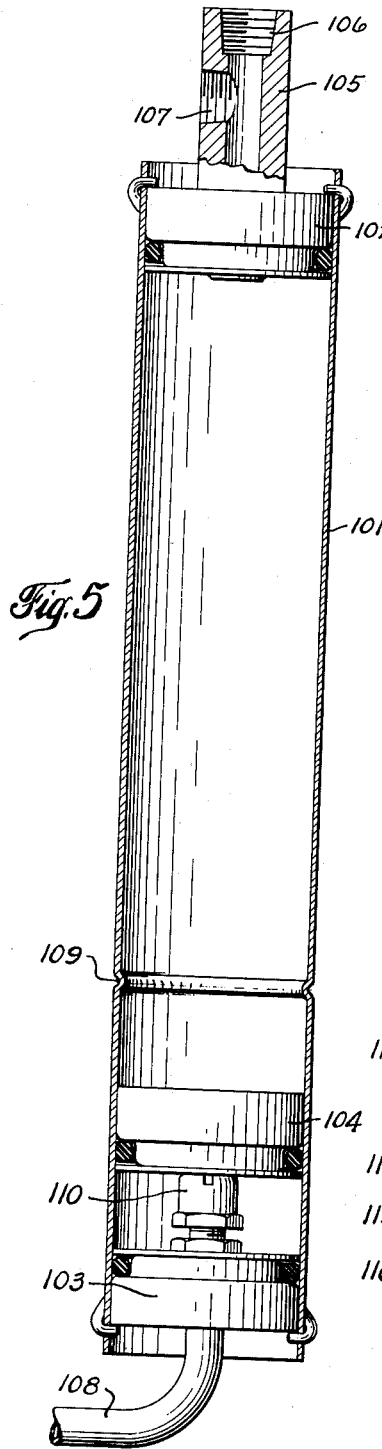
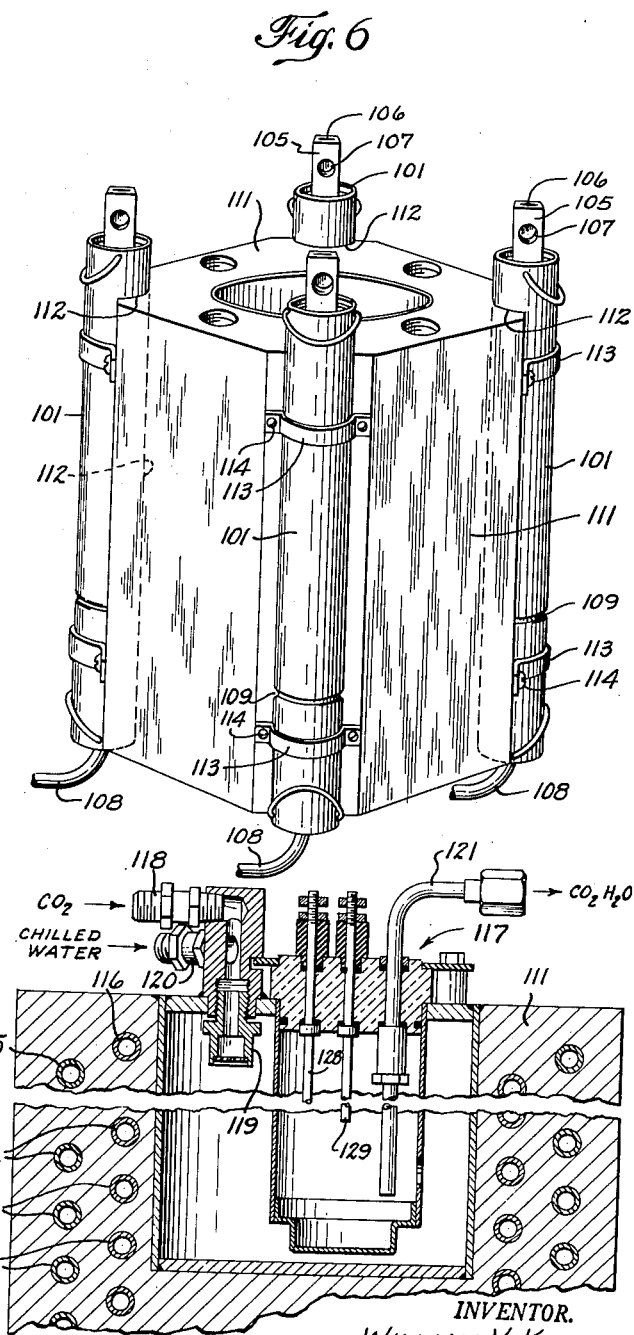
INVENTOR.
WILLIAM V. KING
BY
Morgan, Finnegan & Durham
ATTORNEYS.

United States Patent Office 2,731,906
Patented Jan. 24, 1956

2,731,906
AUTOMATIC BEVERAGE VENDING MACHINES

William V. King, Stamford, Conn., assignor, by mesne assignments, to Rowe Spacarb, Inc., New York, N. Y., a corporation of New York Application October 17, 1951, Serial No. 251,774

16 Claims. (Cl. 99—275)

The present invention relates to automatic beverage dispensing machines having improved syrup or other ingredient supply and cooling means.

Objects and advantages of the invention will be set forth in part hereinafter and in part will be obvious herefrom or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 1 is a view of certain assembled elements comprising the invention in one of its embodiments, a syrup supply measuring valve and solenoid operated control valve being shown in vertical cross-section with various conduit connections and interconnections thereto;

Fig. 2 is a perspective view of the syrup supply valve shown in Fig. 1;

Fig. 3 is a schematic showing of the assembled elements shown in Fig. 1 installed in an automatic beverage dispensing machine designed to dispense a plurality of different drinks;

Fig. 5 is a view partly in vertical cross-section and partly in elevation of a modified embodiment of the syrup supply valve shown in Fig. 1;

Fig. 6 is a perspective view of the syrup supply valve as shown in Fig. 4 assembled in a cooler-carbonator unit for use in beverage dispensing machines, forming another embodiment of the invention; and, Fig. 7 is a fragmentary, vertical cross-sectional view of the cooler-carbonator unit shown in Fig. 6 showing the carbonator installed therein.

Figure 4:
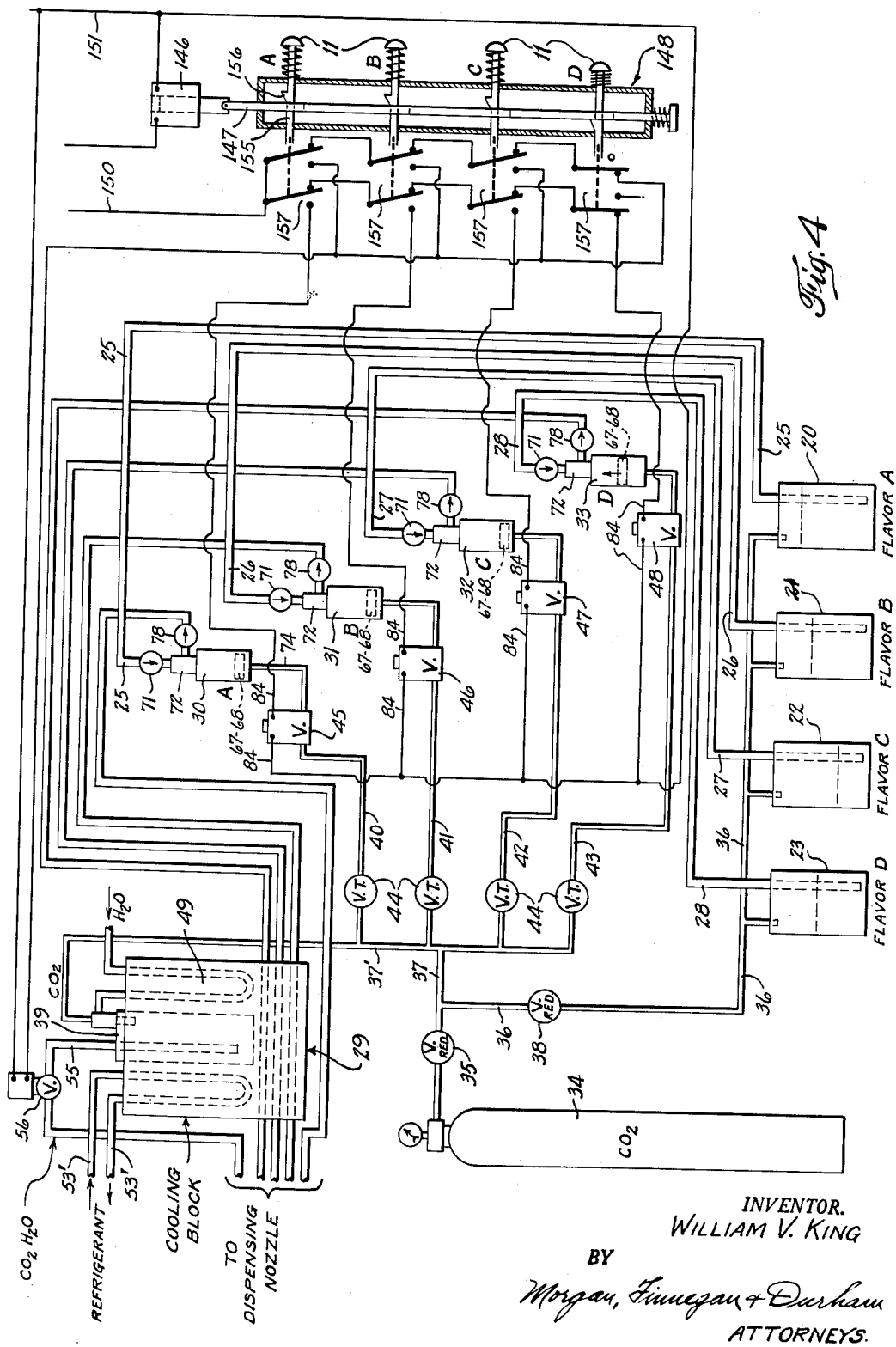
Fig. 4 is a further schematic showing of the dispensing machine shown in Fig. 3 and incorporating the syrup supply valve shown in Figs. 1 and 2, and showing in detail portions of the fluid system of the machine and the control and refrigerating means therefor.

The present invention provides a beverage dispensing machine having an improved syrup or other ingredient supply and cooling means which is particularly adapted for use in automatic cup beverage dispensing machines. Such machines are of the type that are set out on public location and, upon insertion of a coin by the customer, are adapted to dispense a beverage in a paper or other cup which is also discharged from the machine. Most of the machines of this type, and the most successful, effect the mixing of two or more beverage ingredients in the machine to dispense a finished drink, and they supply two or more flavors or kinds of mixed drinks, allowing the customer to exercise a choice and dispense the desired drink.

Although the invention of the present application is of broader application, it is herein illustratively shown and described in connection with an automatic beverage vending machine capable of vending four different drinks, each of which is a mixture of flavoring syrup and carbonated water. The invention in one of its aspects comprises a floating piston valve mechanism and control means therefor for measuring the charge of syrup going into each drink dispensed by the machine. Such measuring valve provides a positive and accurate means for including a given amount of syrup ingredient in each drink dispensed. One difficulty experienced in some automatic beverage vending machines has been that changes in temperature and viscosity of the syrup dispensed tend to vary the quantity of syrup provided in the final drink, thus making it difficult to provide a drink of constant quality. Some syrups are so viscous that it has been difficult or impossible to use them at all in vending machines. The measuring valve of the invention overcomes these difficulties, and likewise provides a unit which may be easily assembled and disassembled and may be conveniently and completely cleaned.

The present invention in another aspect provides a syrup or other ingredient measuring valve having the advantages already mentioned as a part of a cooler-carbonator assembly or unit. In such unit one or more syrup measuring valves are removably secured in heat exchanging relationship to a metallic block wherein a carbonator is centrally positioned. Refrigerant coils for cooling the unit are embedded in the block, as are also water coils for precooling the fresh water going to the carbonator. The unit thus constructed refrigerates the drink ingredients, that is the syrup and carbonated water, going into the completed drink, and at the same time provides the advantages of positively and accurately measured syrup charge, and ease of removal and cleaning, as already discussed.

As a whole, applicant provides a novel and improved automatic beverage dispensing machine of the cup type wherein positive measuring of the syrup and carbonated water ingredients of the drink is insured and simplified refrigerating means are provided. Suitable control means are provided to be actuated by the customer in selectively dispensing the desired one of a plurality of drinks, and the control means are connected for operation of the syrup and measuring valves and carbonated water release valve, the ingredients being dispensed under gas pressure provided by a carbon dioxide source under pressure, and such pressure likewise brings about reciprocating operation of the syrup measuring valves.

Referring now in detail to the illustrative embodiment of the invention shown by way of example in the accompanying drawings, the elements of a beverage vending machine embodying the present invention are shown schematically in Figs. 3 and 4 of the drawings. The mechanism is preferably installed in a suitable cabinet (not shown), and the particular machine illustrated is adapted to dispense four different carbonated drinks, designated as flavors A, B, C and D in the drawings. Selection of the drink desired is under control of the customer by pressing one of the buttons 11 which are preferably positioned on the front panel of the machine, and suitable legends are provided stating what drinks are available. A coin opening 12 is also provided on the front panel to receive the customer's coin, after which the machine is in condition for selection of the drink by pressing one of the buttons 11, and automatic dispensing of the drink follows. A counting mechanism 13 is provided within the machine for showing the operator how many drinks have been vended, and a light 14 is positioned on the front panel to indicate to the customer whether or not the machine is capable of vending a drink.

A cup dispensing mechanism indicated generally by the numeral 15 in Fig. 3 is provided, and the circuit control, as hereinafter set out, is such that a paper cup 16 is dispensed after coin deposit and flavor selection have been accomplished and falls to a position to receive the selected beverage comprising carbonated water and flavor or syrup from the faucet or dispensing nozzle of the machine (not shown). An overflow or drip can 17 is provided beneath the dispensing nozzle to receive accidentally dispensed or spilled fluid, and means are provided for sanitary reasons for interrupting further operation of the machine when the drip can becomes full. Also for sanitary reasons there may be provided a germicidal lamp 18 in the area where the cup 16 is filled from the dispensing nozzle.

The illustrative embodiment of the invention as herein shown and described dispenses carbonated water and syrup or flavor into a paper cup 16 by means of $CO_2$ pressure maintained on the several syrup supply tanks and carbonated water sources, and suitable means are provided for operating valves for the syrup and water in order to dispense the selected flavor, or mixture of flavors, in a drink of substantially uniform size, as selected by the customer. The machine is thus of the general type disclosed in the patent to Bowman No. 2,462,019, and the co-pending application of Parks No. 32,878, filed June 14, 1948, now Patent No. 2,565,084.

As shown in Fig. 4, four different syrups are retained in syrup supply containers 20, 21, 22 and 23, and exit of syrup therefrom takes place through conduits 25, 26, 27 and 28, respectively, three of said syrups passing through a cast cooler-carbonator unit 29. Flavor A in Fig. 4 is illustratively shown as not passing through the cooler-carbonator unit, as might be the case if a warmer drink were desired. The several syrups are positively measured in the dispensing operation by their respective measuring valves 30, 31, 32 and 33, as hereinafter fully described. The syrups are thus directed to any suitable dispensing faucet or nozzle, where they are adapted to be dispensed into a waiting cup along with carbonated water.

A source of $CO_2$ gas under pressure is provided by means of the cylinder 34, and the exit of gas therefrom takes place through a pressure reducing valve 35 and then through two conduits 36 and 37, the former of which is provided with a pressure reducing valve 38 and is directed by suitable branches into the tops of syrup supply tanks 20, 21, 22 and 23 to provide the desired gas pressure therein. The second $CO_2$ gas conduit 37 is directed by line 37' to the carbonator 39 which, together with the aluminum casting 49 within which are cast three of the syrup and the water and refrigerant conduits, comprises the essential elements of cooler-carbonator unit 29. The cooler-carbonator unit herein diagrammatically shown is therefore essentially of the type disclosed in the copending application of Parks No. 785,097, filed November 10, 1947, now Patent No. 2,612,357, issued September 30, 1952. Gas conduit 37 also communicates with branch lines 40, 41, 42 and 43, each one of which is provided with a needle valve 44, and said branch lines communicate with respective solenoid operated valves 45, 46, 47 and 48, which control and operate their respective syrup measuring valves 30, 31, 32 and 33, as will be hereinafter fully described.

The carbonator 39 is supplied with sweet water from a source such as a city water line or the like through conduit 50 (Fig. 3) and solenoid controlled valve 51, a pump 52 furnishing the water under pressure to the carbonator, said pump being automatically controlled by the level of water in the carbonator, which control is hereinafter described. A refrigeration unit 53 is also provided having refrigerant line 53' passing through casting 49 to refrigerate the syrups, water and carbonator, and the refrigeration unit is under the control of thermostat 54 in the cast aluminum block.

Carbonated water from carbonator 39 is drawn out under pressure through conduit 55 under control of solenoid operated valve 56, and is thus conducted to the dispensing nozzle.

As will hereinafter be described in detail, the control of the various elements of the embodied machine is such that when the button 11 for flavor A is pushed by the customer after insertion of the coin in aperture 12, a cup 16 is dispensed and measuring valve 30 for syrup in supply container 20 is operated to positively dispense a measured quantity of syrup flavor A. There is also opened at the same time valve 56 in carbonated water line 55, so that carbonated water and syrup A may flow into the cup, providing a mixed drink of desired and predetermined size. Similarly, if the button 11 for flavor B is pressed, valves 31 and 56 are operated to dispense a mixed drink B into a cup 16, and so on for each of the syrup flavors provided in the machine.

Referring now in detail to the embodied means for providing an accurately measured amount of syrup in each drink dispensed regardless of temperature or viscosity conditions of the syrup, said means comprise the measuring valves 30, 31, 32 and 33 and their associated valves 45, 46, 47 and 48 for controlling $CO_2$ pressure applied upon the measuring valves as a power source. The structure and operation of these several valve assemblies are identical, and are shown in Figs. 1 and 2 of the drawings as that of the measuring valve 30 and its associated solenoid operated valve 45.

As shown, the syrup measuring valve 30 comprises a cylindrical body 60 having a head element comprising shouldered member 61 and circular plate 62 spot-welded thereto, providing a recess wherein an O-ring 63 is positioned for preventing passage of syrup beyond the head element. A similar head element is provided at the other end of cylinder 60 comprising shouldered element 64 with circular plate 65 welded thereto and with O-ring 66 positioned in the annular space provided. A floating piston is positioned within cylinder 60, and is constructed similarly to the two head elements described, comprising a shouldered cylinder body 67 with a plate 68 spot-welded thereto and O-ring type sealing ring 69 positioned in the annular groove between the plate and cylinder. The respective head elements 61—62 and 64—65 are normally held against axial displacement out of the ends of cylinder 60 by means of bails 70, the ends of which pass through suitable apertures provided adjacent the ends of cylinder 60 to engage the skirts of shouldered elements 61 and 64. The $CO_2$ gas pressure or syrup pressure between the head elements when the syrup measuring valve is in operation is sufficient to keep the elements spaced apart and engaged against the stop ends of their respective bails 70.

Entrance of syrup to be dispensed in measured quantities by the syrup valve 30 takes place through conduit 25 from reservoir 20, and check valve 71 permits entrance of syrup into the cylinder 60, but prevents any backward flow of syrup through the valve when pressure within cylinder 60 exceeds pressure on conduit 25. Syrup entering the valve through check valve 71 passes into header or nipple 72 and said header communicates with the interior of cylinder 60 through the head element 61—62. As shown, the end of header 72 may be turned over, as indicated at 73, securing the header to the head element 61—62.

Entrance of $CO_2$ gas as a power source for operation of the syrup measuring valve takes place through conduit 74 at the opposite end of cylinder 60, positioned in a centrally arranged opening in the other head element 64—65. Conduit 74 is removably secured with respect to said head element by means of a shoulder 75 and nut 76 threaded on the end of the conduit. It will be noted that the head elements 61—62 and 64—65 are entirely free to turn within the cylindrical valve casing 60, and this provides for great convenience in assembling and disassembling the valve, and making the necessary connections with other parts of the equipment. It will also be noted that the syrup supply valve may be quickly and easily disassembled by expansion of the bails 70 so that their ends are removed from engagement with cylinder 60, after which the head elements and floating piston may be easily slipped out of the cylinder for proper cleaning.

Exit of syrup from the measuring valve upon the application of gas pressure to the floating piston 67—68 through conduit 74 takes place through header 72 and check valve 78 threadedly engaged therein, which permits passage of syrup in the direction of the arrow thereon, but prevents flow in the opposite direction. The syrup leaving the measuring valve through check valve 78 passes to the dispensing nozzle or faucet of the beverage vending machine as has already been described, and is clearly shown in Fig. 4. Check valve 71 through which syrup entering the measuring valve passes, as indicated by the legend in Fig. 1, is unseated by a relatively low pressure to permit syrup to enter the cylinder 60, and such pressure might be on the order of seven pounds per square inch, for instance. Check valve 78 which permits egress of syrup from the measuring valve is unseated by a relatively high pressure, which might be on the order of 35 to 40 pounds per square inch. It will thus be seen that in the operation of the vending machine as a whole, a $CO_2$ pressure will be maintained on the syrup reservoirs, such as 20, sufficient to unseat check valve 71 and force syrup into cylinder 60, but such pressure will be maintained below that which will unseat the high pressure check valve 78. Also, a $CO_2$ pressure will be maintained in the conduits, such as 40, connected to the conduit 74 for each measuring valve, such that the unseating pressure of check valve 78 will be exceeded. Such pressures may be conveniently regulated by the pressure reducing valves 35 and 38 and the needle valves 44.

Referring now to the embodied means for controlling the application of $CO_2$ pressure to the cylinder 60 on the side of floating piston 67—68 opposite to the syrup admitted therein, the solenoid valve designated generally 45 comprises a base portion 80 with a cylindrical casing 81 mounted thereon surrounding the coil 82 of the solenoid, which also comprises the armature 83. Suitable leads 84 are provided for energizing coil 82 from switch 157 as hereinafter described, and the armature 83 is biased downwardly by the action of coil spring 85 which is seated between a shoulder 86 of the armature and a cylindrical element 87 positioned within the solenoid coil. The base 80 of the valve element is provided with a recess 88 therein which serves as a fluid communication passage and receives spring 85 and the end of armature 83. Said recess 88 communicates by way of duct 89 with conduit 74 to the syrup measuring cylinder 60, by means of a fitting 90 threadedly engaged therein. Positioned in the base 80 is a valve seat member 91 to cooperate with the resilient seating element 92 positioned in the lower end of armature 83. Communication is established through the valve seat 91 with duct 93 in base 80, and conduit 40 (Fig. 4) communicates with duct 93 through fitting 94.

At its upper end the armature 83 is provided with another resilient valve seating element 95 to cooperate with the seat 96 on plug 97 at the top of the solenoid assembly, said plug having a central bore 98. The armature 82 has a groove 99 extending longitudinally thereof for its full length, and said groove together with bore 98, recess 88 and duct 89, opens the conduit 74 and hence the interior of cylinder 60 to atmospheric pressure. With the construction shown and described, it will be apparent that when coil 82 is deenergized, armature 83 will be pressed by spring 85 into seating engagement with valve seat 91, thus closing the cylinder 60 to application of $CO_2$ pressure from supply cylinder 34. The pressure on syrup supply container 20 will force syrup through conduit 25 and check valve 71 to fill cylinder 60 with syrup. This is the normal or stand-by condition of the vending machine before a customer has inserted a coin and made a flavor selection on one of the buttons 11.

When one of the buttons 11 is depressed, such as the button corresponding to flavor A, the coil 82 of the solenoid is energized by circuit means hereinafter described, and armature 83 is impelled upwardly to engage valve seat 96 and close bore 98 leading to atmosphere. By the same motion, duct 93 is opened and $CO_2$ pressure is established from cylinder 34 to the interior of cylinder 60. Floating piston 67—68 is then forced upwardly in the cylinder as shown in Fig. 1 to impel syrup from the cylinder, the syrup passing outwardly through check valve 78 and to the dispensing faucet of the machine. When coil 82 of the solenoid is again deenergized in accordance with control mechanism for the machine as hereinafter described, the normal position of armature 83 is resumed, the interior of cylinder 60 is again opened to atmosphere, and it is filled by another measured quantity of syrup from container 20.

Means are provided for adjustably setting one limiting position of floating piston 67—68 in cylinder 60 in order to vary as desired the measured quantity of syrup automatically dispensed by the vending machine, and as shown said means comprise the internally threaded nut 100 engaged on the end of conduit 74 extending into cylinder 60. The nut 100 may be rotated to vary its axial position in cylinder 60, and one stop position of floating piston 67—68 is thereby adjustable for variation of maximum syrup capacity for the measuring valve. The opposite stop position for the floating piston is, of course, against head element 61—62.

Measuring valve 30, as shown in Figs. 1 and 2 and described above, may conveniently be added to beverage vending machines of presently existing types, by making the necessary syrup and carbon dioxide connections as diagrammatically shown in Fig. 4 and replacing the existing syrup valves. In the embodiment of the invention shown in Figs. 5, 6 and 7 of the drawings, syrup measuring valves of similar structure and function are combined in a cooler-carbonator assembly for the machine, in replacement of the mechanism 29 shown diagrammatically in Fig. 4. As shown, such a measuring valve comprises the cylinder 101 of somewhat greater length than the cylinder 60 shown in Fig. 1, and the measuring valve is otherwise similarly constructed to the embodiment of Figs. 1 and 2 described, having removable head elements 102 and 103, floating piston 104, header 105 with syrup entrance port 106 and exit port 107, and conduit 108 for introduction of $CO_2$ forming a power source for the valve. In this embodiment of the invention, an inwardly rolled bead 109 is provided in the cylinder 101 to limit the movement of floating piston 104 in one direction, and travel in the opposite direction is adjustably limited by nut 110. The travel of piston 104 is therefore between bead 109 and stop nut 110, and it will be seen that cylinder 101 is never completely exhausted of syrup and a supply is held at all times in the cylinder for suitable refrigeration.

Such refrigeration is effected by positioning a plurality of cylinders 101 in heat exchanging relationship with the cast metallic block portion 111 of the cooler-carbonator assembly. As shown in Fig. 6, the block 111 may be formed as a rectangular mass, with the corners removed and provided with arcuate, longitudinally extending grooves 112 to receive the cylinders 101. The cylinders are secured in assembled relationship with respect to the block by means of retaining straps 113 and screws 114 extending into the block, and it will be appreciated that each of the cylinders 101 may be easily removed from the cooler-carbonator assembly and individually disassembled as already discussed in connection with the embodiment of Figs. 1 and 2 for thorough cleaning. The cooler-carbonator assembly comprising the syrup measuring valves as just described further comprises refrigerant coils 115 and water coils 116 which are cast in the metallic block 111. Said coils are preferably provided as inner and outer connected spirals parallel to each other with the inner and outer spirals in staggered relationship for the best heat exchanging properties.

Block 111 is provided with a central well wherein is positioned the carbonator mechanism designated generally by the numeral 117. Said carbonator may be of any suitable and conventional construction, and as shown comprises carbon dioxide inlet fitting 118 for connection to conduit 38 as shown in Fig. 4. Carbon dioxide entering through fitting 118 is intimately mixed in head member 119 with refrigerated sweet water entering the head through fitting 120, directed thereto from tube 115 in the metallic block. Sweet water is directed to spiral tube 115 from source conduit 50 as shown in Fig. 3. Outlet conduit 121 for carbonated water from the carbonator of the present embodiment of the invention is directed through conduit 55, as shown in Fig. 4, to the dispensing nozzle or faucet of the machine. The cooler-carbonator assembly described provides an improved and simplified mechanism in a beverage dispensing machine, in that there is no necessity for casting numerous syrup coils in the metallic block 111, but the syrup is nevertheless adequately precooled before dispensing, a positive and accurate measurement of dispensed syrup is effected, and the syrup containing elements are easily disassembled and cleaned.

The control circuit and mechanism for the beverage vending machine of the invention is shown in detail in Fig. 3 of the drawings. As there shown the main lead lines 125, 126 are provided as power for the machine connected through main switch 127 to any suitable source (not shown). The carbonator 39 (or 117) is diagrammatically shown with short and long electrodes 128 and 129 respectively for automatically controlling water level in the chamber by means of pump 52 and solenoid controlled valve 51. In the condition shown in Fig. 3, pump 52 is in operation connected to leads 125 and 126, and valve 51 is also connected to the leads and is open. As water is supplied to the carbonator chamber, the short electrode 128 will be contacted, and at that time the secondary circuit of transformer 130 is closed, which actuates relay 131, throwing switch 132 to disconnect pump 52 and valve 51, and connects the long electrode 129 in parallel with the short electrode 128. As water is drawn from the carbonator, the long electrode 129 becomes uncovered, the secondary circuit of transformer 130 is broken, relay 131 is deenergized with switch 132 returning to the position shown in Fig. 3. Pump 52 thereupon begins operation again, valve 51 is opened, and the long electrode 129 is disconnected from the circuit.

Turning now to customer operation of the machine by depositing a coin and making a drink selection, the insertion of a coin through aperture 12 directs the coin through the chute to close switch 135 in its path of travel. It is assumed that anti-jack pot relay 136 is set as shown for normal operation of the machine. The closing of switch 135 energizes relay 137, which sets up the holding circuit of the relay and energizes cup dispenser motor 138. Motor 138 then operates to drop the lowermost cup from the cup dispenser, and at the same time cam 139 is rotated a short distance to close momentarily switch 140, which energizes relay 141 thereby energizing the entire drink selector and dispensing circuit and its own holding circuit.

As cam 139 continues to turn, it engages arm 142 of switch 143. Switches 143 and 144, as diagrammatically shown, are mechanically interconnected for simultaneous snap action to the opposite position shown in Fig. 3, and automatic return to said position. Movement of switch 144 by operation of cam 139 upon arm 142 breaks the circuit to relay 137, which then returns to its original position as shown in Fig. 3. Switch 143, when so actuated, maintains the circuit to dispenser motor 138 until cam 139 clears arm 142, at which time the circuit to motor 138 is opened and the cup dispensing operation is completed.

As relay 137 was energized as described, solenoids 145 and 146 were energized, whereby counter 13 is actuated, and shaft 147 in the selector button assembly 148 is raised to clear the mechanical lock-in mechanism, so that any selector button 11 pushed in during the previous drink dispensing operation will be released. As relay 141 is actuated as has been described, the circuit to solenoids 145 and 146 is broken. The actuation of relay 141 energizes the select flavor and drink dispensing circuit which comprises the leads 150 and 151. A light 152 is positioned behind each selector button 11, which buttons are preferably of translucent material, and the light is turned on when the circuit just mentioned comprising leads 150 and 151 is energized, serving as a visual indication to the customer that the machine is in condition for making a drink selection by pushing a selector button.

The timer hold relay 153 is energized with the circuit including leads 150, 151, and this in turn energizes interlock relay 154. The machine is now in condition for customer selection of a beverage and the dispensing thereof, and the customer may, for instance, press in the button 11 for the flavor A, being the uppermost button of assembly 148. As diagrammatically shown in Fig. 3, the button depresses its shaft 155 and detent 156 maintains the shaft in such depressed condition by engagement with shaft 147 until the latter is raised by solenoid 146 after the next coin deposit. Double pole switch 157 is actuated by shaft 155 connected thereto, and as a consequence thereof the energizing circuit for relay 153 is broken and it returns to its normal position shown in Fig. 3, the contacts in this position starting operation of timing motor 158. Actuation of switch 157 has also energized the circuits to the solenoid control valve 45 for syrup supply valve 30, and to the carbonated water valve 56. A measured quantity of syrup A is then pumped from valve 30 to the dispensing nozzle, and carbonated water flows simultaneously through valve 56 to the dispensing nozzle.

During dispensing of the drink as described, the cam 159 is being driven in rotary motion by motor 158, and in the course of its motion it engages knock-out switch 160, momentarily opening it and breaking the entire circuit through relay 141. This deenergizes the interlock relay 154, deenergizes the flavor selection and drink dispensing circuit including leads 150, 151, and the entire machine is then returned to its normal or at rest position, in condition to receive another coin and have the described operation repeated.

In the course of the operation described, it will be apparent that a drink comprising flavor syrup A and carbonated water has been automatically dispensed by the machine. The size of the drink is of predetermined and substantially constant quantity, due to the fact that a substantially constant pressure for a timed period has dispensed the carbonated water through solenoid valve 56 while it was open, and energization of coil 82 of control valve 45 has admitted $CO_2$ pressure to pump a measured quantity of syrup from measuring valve 30. The pumping of such measured quantity takes place during the timed active cycle of the machine before cam 159 actuates knock-out switch 160 so that the full quantity of syrup is dispensed, and upon deenergization of the flavor selection and drink dispensing circuit including leads 150, 151 as described, coil 82 is deenergized, valve 30 is returned from $CO_2$ pressure to atmosphere through duct 98, and the pressure on syrup reservoir 20 again fills cylinder 60, moving floating piston 67—68 to its stop position against nut 100.

It will be appreciated that the operation of the automatic beverage dispensing machine is exactly the same as has been described should the customer select other of the flavors, B, C or D, and push the appropriate button 11 after depositing a coin in the machine. In each case, the respective solenoid control valve 46, 47 or 48 will be energized to admit $CO_2$ pressure to a syrup measuring valve 31, 32 or 33 to pump a measured quantity of syrup, and at the same time valve 56 is opened to provide carbonated water in measured quantity for the drink.

The operation of the machine is the same whether syrup measuring valves such as those shown in Figs. 1 and 2, or those shown in Figs. 6 and 7 with the cooler-carbonator assembly there illustrated, are used.

Two or more flavors can be mixed in the machine of the invention, allowing the customer to obtain a final drink of any desired mixture and proportions of flavors A, B and C. To illustrate, the customer might first push the button 11 for flavor C which might, for example, be a cola drink, and the drink begins to be dispensed immediately from the faucet. During the timed cycle of dispensing which the customer may judge by watching the filling of the cup, he may make another flavor selection, as for instance by pushing the top button 11 for flavor A. The result is that shaft 147 is raised by detent 156 of the shaft 155 for flavor A, and the corresponding shaft for flavor C is allowed to return to its original position by release of its detent. The switch 157 is thus actuated as the corresponding switch for flavor C is allowed to return to its original condition, and consequently measuring valve 32 which has been dispensing syrup of flavor C is rendered inoperative, and valve 30 is rendered operative to dispense syrup of flavor A for the balance of the timed cycle of motor 110, unless of course there is further flavor change by the customer during the cycle. Flavor A might, for instance, be a fruit flavor such as lime, providing the customer with a lime-flavored cola drink. The actuating pressure of $CO_2$ for each of the syrup measuring valves 30, 31, 32 and 33 may be so adjusted by means of the several needle valves 44 that the time required to pump out the measured quantity of syrup will generally correspond to the time cycle of the dispensing circuit including leads 150 and 151. Thus, when an additional flavor is selected during the dispensing cycle, the proportions of flavor in the final drink will be generally in accordance with the point during the cycle at which the second button was pushed. As has been said, the customer is able to observe the progression of the time cycle by watching filling of the cup, and thus control the proportions of syrup as desired. It may be noted that each syrup measuring valve, though dispensing a full predetermined measured quantity of syrup if allowed to complete its action, may be interrupted in its action when another flavor selection button 11 is pushed by the customer. The coil 82 of the solenoid control valve is immediately deenergized, terminating further $CO_2$ operating pressure on the measuring valve, and the valve is thereafter refilled. At the same time, the customer has energized the coil of the control valve for another syrup measuring valve, which then operates to dispense syrup during the balance of the timed cycle of the machine, at which time both syrup and carbonated water dispensing ceases.

Returning now to the control circuit and mechanism shown in Fig. 3 of the drawings, it will be seen that the circuit including switches 157 for all flavors is a so-called cascade circuit, so that if two buttons 11 are pushed in at the same time by a customer, the upper button of the plurality pushed takes precedence to establish the operating circuit to the syrup and carbonated water valves, so that only one flavor beverage is dispensed and thus the upper of those located on the button assembly 148.

The cup dispensing mechanism 15 is of a now conventional type which comprises a plurality of stacks of cups, a new stack being turned to dispensing position as the one in position is exhausted. Thus, when the cup level drops below arm 165, the arm is allowed to raise completing the circuit to motor 166, which rotates the reserve stacks until the next is in position to vend cups, the new stack automatically resetting arm 165 to stop motor 166.

The anti jack pot relay 136 is actuated to open the main feed circuit and light the indicator light 14 when the machine, for any of several reasons, is not in condition for further operation. Thus, when drip can 17 becomes too full, the switch for it is closed to actuate the relay, and the same result occurs if the cup dispenser 15 is substantially exhausted of cups and arm 167 is allowed to rise. If the sequence of operation of relays 137 and 141 in relation to operation of switch 160 by cam 159 is not maintained for proper functioning of the machine in the way described, relay 136 is also actuated to prevent unintended dispensing of fluids. After the defective condition in the machine has been rectified, relay 136 may be reset by hand.

The invention in its broader aspects is not limited to the specific mechanisms shown and described but departures may be made therefrom, within the scope of the accompanying claims, without departing from the principles of the invention and without sacrificing its chief advantages.

What is claimed is:

1. In a beverage vending machine of the type described, a carbonator, a plurality of individual syrup sources, a source of $CO_2$ gas under pressure, a plurality of conduits for conducting $CO_2$ gas from said source to said carbonator and to each of said syrup sources, a metallic block surrounding said carbonator, separate conduits for refrigerant and sweet water cast into said block, said sweet water conduit communicating with said carbonator, a plurality of syrup measuring valves in contact with said metallic block for heat exchanging relationship therewith, each said valves comprising a cylindrical member having closures at either end thereof, a floating piston therein, a $CO_2$ conduit communicating with one end of said cylindrical member and said $CO_2$ source, two other conduits communicating with the other end of said cylindrical member one of said conduits communicating with one of said syrup sources and the other said conduit allowing egress of syrup from the cylindrical element, and a control valve element for each said syrup measuring valve positioned in the $CO_2$ conduit communicating with said one end of said cylindrical member, said control valve element having positions for permitting fluid communication between said $CO_2$ source and said cylindrical element, and preventing such communication and opening said cylindrical element to atmospheric pressure.

2. The device as set forth in claim 1 wherein a carbonated water valve is provided for permitting and preventing egress of carbonated water from said carbonator, and selective control means are provided for selectively dispensing different drinks comprising syrup and carbonated water, said means comprising a plurality of control separate elements each operatively connected to said carbonated water valve and to a different one of said control valve elements.

3. The device as set forth in claim 2 wherein said carbonated water valve and said control valve elements are each solenoid controlled, and the operative connection with said separate control elements comprises circuit means between each said element and said carbonated water valve and individual circuit means between each said control element and a different said control valve element.

4. In a beverage vending machine of the type described, a carbonator, a plurality of individual syrup sources, a source of $CO_2$ gas under pressure, a plurality of conduits for conducting $CO_2$ gas from said source to said carbonator and to each of said syrup sources, a carbonated water valve for controlling egress of carbonated water from said carbonator, a plurality of syrup measuring valves, individual conduits between each said syrup source and a respective one of said syrup measuring valves, each said syrup measuring valve comprising a cylindrical member having closures at either end thereof and a floating piston therein, a $CO_2$ conduit communicating with one end of said cylindrical member and said $CO_2$ source, two other conduits communicating with the other end of said cylindrical member one of said conduits communicating with one of said syrup sources and the other said conduit allowing egress of syrup from the cylindrical element for dispensing, a control valve element for each said syrup measuring valve positioned in the $CO_2$ conduit communicating with said one end of said cylindrical member, said control valve element having positions for permitting fluid communication between said $CO_2$ source and said cylindrical element, and preventing such communication and opening said cylindrical element to atmospheric pressure, and means for selectively operating each said control valve and the carbonated water valve simultaneously therewith.

5. The beverage vending machine as set forth in claim 4 wherein said carbonated water valve and said control valves are solenoid operated and said selective control means comprises individual elements to be actuated by a customer in making a drink selection and circuits between each of said elements and the solenoid for said carbonated water valve and between each of said elements and the solenoid of a respective one of said control valves.

6. The beverage vending machine as set forth in claim 5 wherein other circuit means are provided to said individual control elements for energizing and deenergizing the circuits from said elements, and timing means are provided for said other circuit means for the timed energizing of said other circuit means.

7. A beverage vending machine for dispensing drinks containing carbonated water and a flavor syrup comprising, in combination, means for dispensing carbonated water including a pressurized container for carbonated water and a valve controlling the flow therefrom, a plurality of pressurized syrup containers, a gas pressure source, a syrup measuring valve for controlling and measuring the syrup flow from each said container, each said measuring valve comprising a closed cylindrical member having a floating piston therein, gas conduit means between said gas pressure source and, respectively, one end of each said cylinder, said pressurized container for carbonated water, and each said syrup container, a pair of conduits communicating with the other end of said cylindrical member one said conduit communicating with a respective one of said syrup containers and the other said conduit permitting egress of syrup from the cylindrical element, control valve means in each said gas conduit means between one end of said cylindrical element and gas pressure source, said control valve means having positions establishing communication between said source and said cylindrical element and preventing said communication and opening said cylindrical element to atmosphere, and selective control means for dispensing drinks including an actuating element for each drink to be dispensed and operative connections between each said element and said carbonated water valve and a respective one of said control valves.

8. The beverage vending machine as set forth in claim 7 wherein refrigeration means are provided comprising a refrigerated metallic block surrounding said pressurized container for carbonated water and said syrup measuring valves are in contact with said block in heat exchanging relationship therewith.

9. A measuring valve comprising, in combination, a cylindrical element open at each end having a substantially uniform internal diameter including the ends thereof, a floating piston in said element, a circular removable head member of substantially the same diameter as said piston for each end of said element, said members being slidably positioned in said element and removable through an end thereof, and a pair of expansible bail-like members each having ends adapted to be re-movably positioned in holes in said element adjacent a respective end thereof said bail-like member ends being engageable by abutment by one of said head members, preventing movement of said head member out of the end of said cylindrical element and not otherwise restricting movement of said head member.

10. A measuring valve comprising, in combination, a cylindrical element, a floating piston in said element, a pair of conduits communicating with one end of said element, a one-way check valve in each of said conduits said check valves being arranged to permit fluid flows in opposite directions with respect to each other, a third conduit communicating with the other end of said element, and a control valve for said third conduit, said control valve comprising a pair of ducts communicating with said third conduit one of said ducts communicating with atmosphere and the other of said ducts being adapted to be connected with a source of gas under pressure, and movable means for selectively and alternately opening said third conduit for communication with said two ducts.

11. A measuring valve as set forth in claim 13 wherein each of said head members is provided with a fitting passing therethrough and secured thereto, each said fitting having a conduit therethrough establishing communication with the interior of the cylindrical element, one of said fittings extending a substantial distance through and beyond its head member, means are provided on the end of said one of said fittings adjustable axially of the cylindrical element, and said cylindrical element has portions extending radially inwardly thereof spaced substantial distances from the ends of said element, said portions and said adjustable means on the end of said one fitting serving as stops limiting axial movement of the floating piston.

12. A measuring valve as set forth in claim 11, wherein said piston and head members each comprise a shouldered cylindrical member and a circular plate secured thereto providing an annular groove, and sealing means are provided in the annular groove of said piston and head members.

13. A cooler-carbonator for beverage dispensing machines comprising, in combination, a longitudinally extending metallic block, a longitudinally extending carbonator in contact with, centrally arranged in, and surrounded by, said block, a conduit for refrigerant symmetrically arranged in said block, and a plurality of syrup measuring valves also in contact with said block, said carbonator and measuring valves being in heat exchanging relationship with said block throughout the major portion of their lengths, each said measuring valve comprising a cylindrical element having closed ends, a floating piston therein, a gas conduit communicating with one end of said cylindrical element and a pair of syrup conduits communicating with the other end of said cylindrical element, said cylindrical elements being positioned with their axes substantially parallel to the axis of said carbonator and substantially equidistant therefrom.

14. The cooler-carbonator as set forth in claim 13 wherein arcuate grooves are provided in said metallic block and said cylindrical elements are removably secured in said grooves.

15. The cooler-carbonator as set forth in claim 13 wherein said cylindrical elements are at least partially surrounded by said metallic block.

16. The cooler-carbonator as set forth in claim 13 wherein movement limiting means are provided for said floating piston at a place in said cylindrical element between said piston and said end of said element having communication with said pair of conduits said place being substantially spaced from said end of said element, whereby a reservoir of syrup may be maintained in said cylindrical element.

(References on following page)

References Cited in the file of this patent

UNITED STATES PATENTS

| | | |
|---|---|---|
| 154,408 | McKnight | Aug. 25, 1874 |
| 507,316 | Fowler | Oct. 24, 1893 |
| 804,504 | Saalbach | Nov. 14, 1905 |
| 1,221,288 | Canaday | Apr. 3, 1917 |
| 1,974,236 | Cantacuzene | Sept. 18, 1934 |
| 2,455,551 | Booth | Dec. 7, 1948 |
| 2,462,019 | Bowman | Dec. 15, 1949 |
| 2,565,084 | Parks | Aug. 21, 1951 |

FOREIGN PATENTS

| | | |
|---|---|---|
| 35,372 | Germany | Apr. 24, 1886 |